April 24, 1951 W. J. FLINTJER 2,550,144
KNIFE CONSTRUCTION FOR BEET TOPPERS
Filed June 30, 1949
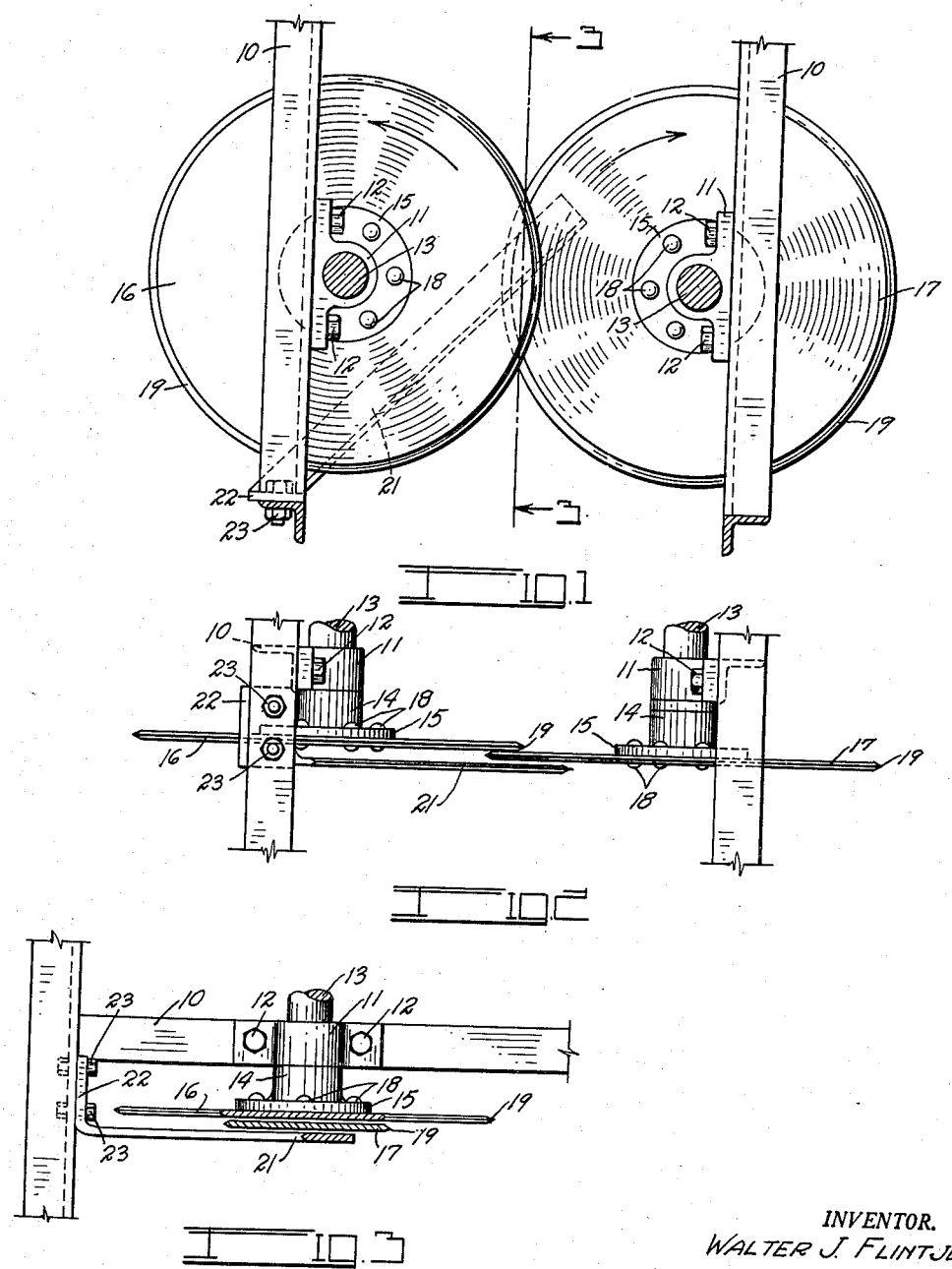
INVENTOR.
WALTER J. FLINTJER
BY
ATTORNEY Patented Apr. 24, 1951

2,550,144

UNITED STATES PATENT OFFICE 2,550,144

KNIFE CONSTRUCTION FOR BEET TOPPERS

Walter J. Flintjer, Cheyenne, Wyo.

Application June 30, 1949, Serial No. 102,341

2 Claims. (Cl. 56—295)

This invention relates to top-severing means for beet harvesters. In many types of beet harvesters the tops and crowns are cut from the beets by means of two overlapping, power-driven, rotary disc knives. Such knives have not been satisfactory, due to the fact that under certain conditions of weather and beets, the knives will not cleanly separate the tops, due to the fact that the tough foliage will fold back between the two knives without being cut by either.

The principal object of this invention is to provide a simple and highly efficient device which will force the beet tops and crowns to be cut by the knives as they pass therebetween regardless of the condition of the beets or foliage.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of a pair of overlapped, circular disc knives of the type employed in the beet harvesting machines, illustrating the invention applied thereto;

Fig. 2 is an edge view thereof; and

Fig. 3 is a cross-section through the knives, taken on the line 3—3, Fig. 1.

The method of mounting and driving the knives forms no part of the present invention. They may be mounted and driven in any manner suitable to the beet harvester in which they are embodied.

In the drawings, a portion of a harvester knife frame is indicated at 10. The journal boxes for supporting the knives are indicated at 11 secured to the frame 10 by means of suitable attachment bolts 12. The journal boxes 11 rotatably support knife shafts 13, upon which knife hubs 14 are mounted.

The knife hubs are flanged, as shown at 15, and suitable circular disc knives 16 and 17 are secured to the flanges 15 by means of rivets 18, or in any other desired manner. The knives are provided with sharpened peripheral edges 19. The construction described is simply illustrative of a typical disc knife construction and mounting.

For the purposes of this invention, it is essential that the knife 16 overlap the knife 17 at the adjacent edges of both. As thus far described, the construction is similar to many beet topping mechanisms.

It has been found that when frozen, stringy beet foliage is encountered, the lower knife 17 will swing the foliage to one side, while the upper knife 16 swings it to the other, so that the leaves and stalks become jammed between the overlapping knife edges to interfere with perfect topping.

It has been found that this can be completely avoided by placing a stationary, diagonal knife blade 21 immediately below both knives so that its forward edge will intersect the vertical plane of the chord joining the intersections of the overlapped edges at substantially the point of greatest overlap. The stationary diagonal knife blade is positioned immediately under the lower disc knife 17 and is fixedly mounted in any desired manner.

As illustrated, the fixed extremity of the knife 21, indicated at 22, is turned at an angle of 90° to the plane of the knife blade 21. This turned extremity 22 is then bolted fixedly to the frame 10 by means of suitable attachment bolts 23.

Let us assume that the disc knives are rotating in the direction of the arrows in Fig. 1, and that a beet crown is passed against the overlapped knives. Any tendency on the part of the beet tops to be forced by the knife 17 to the left beneath the knife 16 is overcome by the crown striking the inclined blade 21, which immediately forces the tops back toward the center line position, where they are completely sheared by the coaction of the two disc knives.

It is not essential that the leading edge of the stationary knife be sharpened, since its main purpose is to prevent sideward deflection of the beet tops. It has been found, however, that if this blade is sharpened, the beets and tops will pass through much more readily and with less friction than if a dull edge were employed.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A beet top severing construction for beet harvesters comprising: a first circular disc knife; a second circular disc knife; means for rotatably mounting said knives adjacent each other so that the adjacent edge of the first knife will overlap the adjacent edge of the second knife; and a stationary third knife blade positioned to underly the second disc knife at its point of overlap with the first disc knife, said stationary knife blade being positioned at an angle of substantially 45° to a chord joining the intersecting circumferences of the two disc knives.

2. A knife construction for topping beets in a beet harvesting machine comprising: two flat knife discs having continuous circular cutting edges, said knives being positioned one above the other in adjacent parallel planes with their adjacent peripheries in overlapped relation; and an elongated, diagonally positioned, substantially straight knife member extending from a point beneath the uppermost knife disc and ahead of a line joining the axes of the two knife discs rearwardly to a point beneath the lowermost knife disc and rearward of said line, the forward edge of said straight knife member lying diagonally beneath the point of greatest overlap of said knife discs and in a plane parallel to, and closely adjacent to, the planes of said knives.

WALTER J. FLINTJER.

REFERENCES CITED

The following references are of record in the file of this patent:

UNITED STATES PATENTS

| Number | Name | Date |
| --- | --- | --- |
| 482,307 | Hansen | Sept. 6, 1892 |
| 1,012,892 | Moody | Dec. 26, 1911 |